W. B. Wickes,
Plant Protector.
No. 87,313. Fig. 1. Patented Feb. 23, 1869.
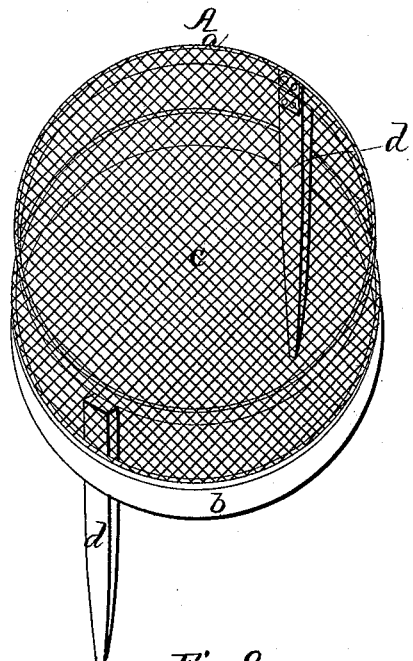
Fig. 2.
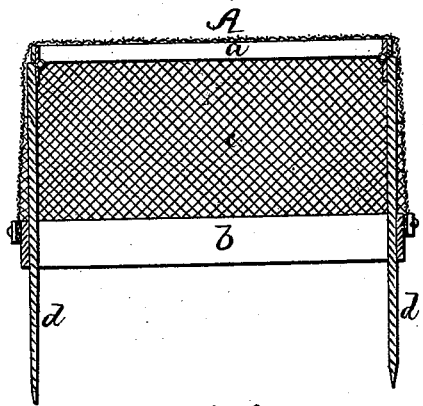
Fig. 3.
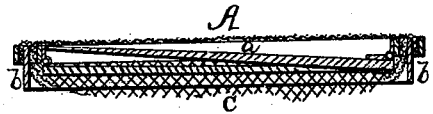
Witnesses;
Geo. A. Loring.
Edward Griffith.
Inventor;
Wm. B. Wickes
by his Attorney,
Frederick Curtis

WILLIAM B. WICKES, OF SHARON, MASSACHUSETTS.

Letters Patent No. 87,313, dated February 23, 1869.

IMPROVEMENT IN PLANT-PROTECTOR.

The Schedule referred to in these Letters Patent and making part of the same.

*To all to whom these presents shall come:*

Be it known that I, WILLIAM B. WICKES, of Sharon, in the county of Norfolk, and State of Massachusetts, have made an invention of a new and useful Improvement in Plant-Protectors; and do hereby declare the following to be a full, clear, and exact description thereof, due reference being had to the accompanying drawings, making part of this specification, and in which—

Figure 1 is a perspective view, and

Figure 2, a vertical section of the said invention or improvement.

Figure 3 is a section of the device in a folded state.

My present invention has reference to that class of plant-protectors in which a cylinder or case of gauze or netting is employed as a means of protecting plants from the ravages of insects, or bugs, or worms, of any description, such netting or shield being combined with a hoop, which rests closely upon or enters somewhat into the earth, in order to prevent access being had to the interior of the netting from below such hoop.

This invention relates to means, first, for providing ample room for the plants, as they increase in growth and leaves; and, secondly, in constructing a plant-protector in such manner, and when productive of new and advantageous results, as that it may be contracted and folded into small compass, for transportation or storage.

The invention consists in a skeleton-frame, composed, in the present instance, of two hoops, united by an inverted bag of gauze-netting, the lower hoop of the two being provided with two or more folding legs or stakes, for affixing the device in proper position upon the ground and about the plant, the parts, thus combined, being susceptible of being closely folded together, or contracted into small compass, as shown in fig. 3 of the accompanying drawings.

The reader, by referring to the accompanying drawings, which illustrate my invention, will see that a plant-protector, as embodying my present invention, is shown at A, as composed of two hoops, *a b*, of any suitable material, such hoops being united by an inverted bag, *c*, of gauze netting, or other suitable textile fabric.

The gauze bag is intended to be of nearly equal diameter throughout, in order to provide ample space for permitting an undisturbed growth and expansion of the plant enclosed by it, my invention, in this respect, possessing great advantages over others of its class now in use.

To the interior periphery of the uppermost hoop, I hinge two or more legs or supports, *d d*, &c., such legs serving the double purpose of maintaining the gauze-leg in an upright and distended condition, and of sustaining it firmly in position upon the ground, about a plant, against accidental misplacement from birds, gusts of wind, &c., it being understood that the lowermost hoop, in practice, is pressed partially or wholly into the ground, about such plant.

When not wanted for use, the above device may be folded into very small compass, as exhibited in fig. 3 of the accompanying drawings, in which condition it is in a very convenient and compact state for storage or transportation.

I would remark that I do not wish to confine myself to the circular form of the hoops *a b*, as such hoops or supports may be square or polygonal.

Claim.

I claim as my invention, and desire to secure by Letters Patent of the United States—

The herein-described plant-protector, as composed of the gauze cylinder or bag *c*, the hoops *a b*, and the legs *d d*, &c., the whole being combined, arranged, and operating as before set forth and explained.

WILLIAM B. WICKES.

Witnesses:
 FRED. CURTIS,
 GEO. A. LORING.